(12) United States Patent
Xiong et al.

(10) Patent No.: US 10,823,582 B2
(45) Date of Patent: Nov. 3, 2020

(54) ANGLE DETECTION DEVICE AND METHOD OF MULTI-TURN SERVO, AND MULTI-TURN SERVO

(71) Applicant: UBTECH Robotics Corp, Shenzhen (CN)

(72) Inventors: Youjun Xiong, Shenzhen (CN); Wenhua Fan, Shenzhen (CN); Yongping Zeng, Shenzhen (CN); Sheng Zhou, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 169 days.

(21) Appl. No.: 16/141,987

(22) Filed: Sep. 26, 2018

(65) Prior Publication Data

US 2019/0186954 A1 Jun. 20, 2019

(30) Foreign Application Priority Data

Dec. 14, 2017 (CN) .......................... 2017 1 1336712

(51) Int. Cl.
*G01D 5/12* (2006.01)
*G01D 5/244* (2006.01)
(52) U.S. Cl.
CPC ........... *G01D 5/12* (2013.01); *G01D 5/24428* (2013.01); *G01D 5/24471* (2013.01)

(58) Field of Classification Search
CPC ... G01D 5/12; G01D 5/24428; G01D 5/24471
See application file for complete search history.

(56) References Cited

U.S. PATENT DOCUMENTS

2017/0184420 A1* 6/2017 Schrubbe ............. G01D 5/2497
2018/0304457 A1* 10/2018 Hutson ................ B25J 19/0016

FOREIGN PATENT DOCUMENTS

| CN | 201522288 U | 7/2010 |
|----|-------------|--------|
| CN | 203203607 U | 9/2013 |
| CN | 105222814 A | 1/2016 |

* cited by examiner

*Primary Examiner* — Tung X Nguyen
*Assistant Examiner* — Feba Pothen (57) ABSTRACT

The present disclosure relates to servo technology, and particularly to a method and a device for detecting rotation angle of a multi-turn servo, and a multi-turn servo. The method includes: driving a multi-turn servo to be at a zero-point position; obtaining an accurate angle and a number of rotation when the multi-turn servo is at the zero-point position; detecting a current angle of the multi-turn servo in a real-time manner; incrementing the number of rotation by one in response to a zero-point forward jump between a current angle and a previous angle; decrementing the number of rotation by one in response to a zero-point backward jump between the current angle and the previous angle; and determining a current rotation angle of the multi-turn servo in accordance with an accurate angle, a current angle, and the number of rotation stored on the storage.

9 Claims, 5 Drawing Sheets

ANGLE DETECTION DEVICE AND METHOD OF MULTI-TURN SERVO, AND MULTI-TURN SERVO

CROSS REFERENCE TO RELATED APPLICATIONS

This application claims priority to Chinese Patent Application No. 201711336712.0, filed Dec. 14, 2017, which is hereby incorporated by reference herein as if set forth in its entirety.

BACKGROUND

1. Technical Field

The present disclosure relates to servo technology, and particularly to an angle detection device and method of a multi-turn servo, and a multi-turn servo.

2. Description of Related Art

A servo is an electrical component that converts rotational motion of a motor into a specific angular motion. It is widely used in applications where it is necessary to control the angle of rotation or provide high torque, such as aeromodelling control, pan/tilt control, and robotic power supply.

The conventional servo generally uses a potentiometer to detect the rotation angle of the servo. However, due to the limitation of the potentiometer, it can generally only detect the angle within 180 degrees. With the development of servo technology, many servos are equipped with magnetic encoder sensors to expand the angle detection range of the servo, such as 360 degree. However, regardless of the potentiometer or the magnetic sensor, the angle detection cannot realize the angle greater than 360 degrees. With the increase of the application of the servo, the rotation angle of the servo is also gradually expanded. If multiple rotations are required, the existing servos may not accurately determine the rotation angle of the servo. Therefore, the angle control of the multi-turn position of the servo cannot be realized, which affects the performance of the servo.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms "a," "an," and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

For the purpose of describing the technical solutions of the present disclosure, the following describes through specific embodiments.

Figure 1:
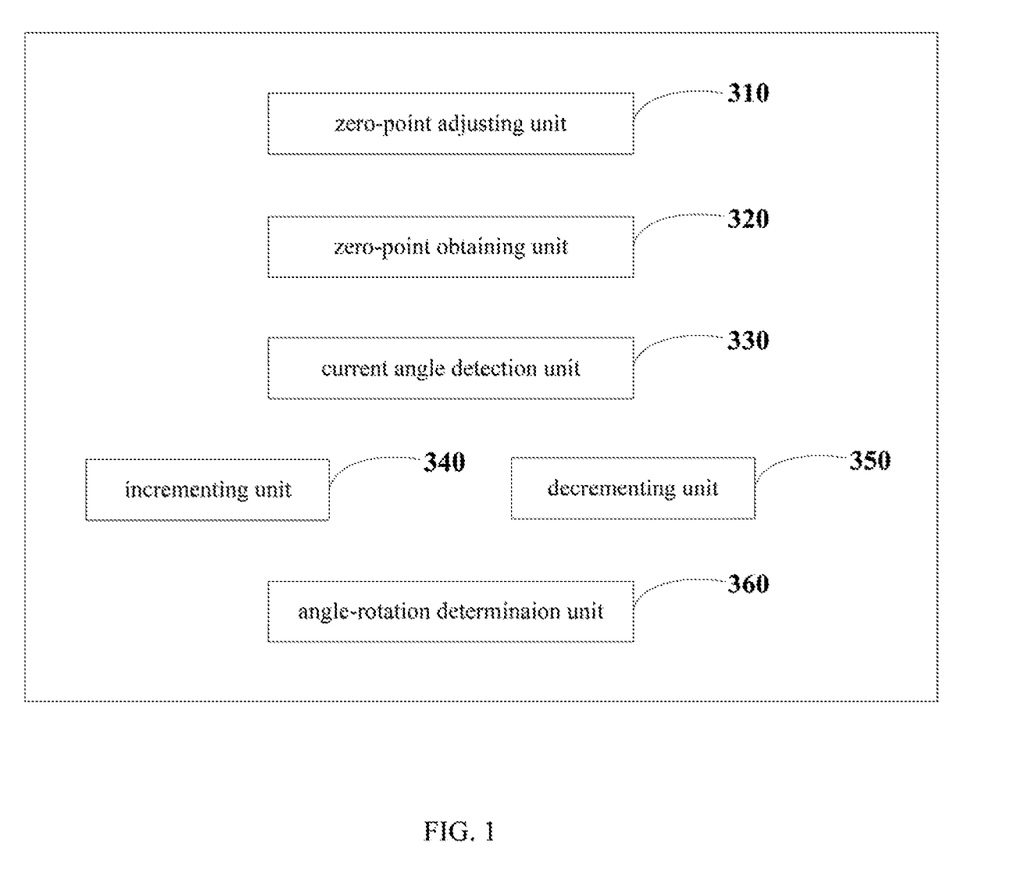
FIG. 1 is a schematic view of an angle detection device for a multi-turn servo in accordance with one embodiment of the present disclosure.

FIG. 1 is a schematic view of an angle detection device for a multi-turn servo in accordance with one embodiment of the present disclosure. The angle detection device includes:

a zero-point adjusting unit 310 configured to drive the multi-turn servo to be at a zero-point position;

a zero-point obtaining unit 320 configured to obtain an accurate angle and a number of rotation when the multi-turn servo is at the zero-point position;

a current angle detection unit 330 configured to detect a current angle of the multi-turn servo in a real-time manner;

an incrementing unit 340 configured to increment the number of rotation by one in response to a zero-point forward jump between a current angle and a previous angle;

a decrementing unit 350 configured to decrement the number of rotation by one in response to a zero-point backward jump between a current angle and a previous angle; and an angle-rotation determination unit 360 configured to determine a current rotation angle of the multi-turn servo in accordance with an accurate angle, a current angle, and the number of rotation.

The zero-point forward jump refers to an angle change when the multi-turn servo rotates across the zero-point along a first direction. The zero-point backward jump refers to an angle change when the multi-turn servo rotates across the zero-point along a second direction opposite to the first direction.

The zero-point adjusting unit 310 further includes:

an initial angle obtaining sub-unit configured to obtain an initial angle of the multi-turn servo when the multi-turn servo is at an initial position;

a zero-point first labeling sub-unit configured to label the initial position as the zero-point position in response to the initial angle being the same with a default angle, wherein the default angle is directed to an angle when the multi-turn servo is at the zero-point position;

a zero-point second labeling sub-unit configured to adjust the initial angle to be the default angle so as to adjust the servo to be at the zero-point position in response to the initial angle being different from the default angle.

Further, the angle detection device further includes a turns correction unit configured to:

store a power-on angle in response to the multi-turn servo being powered off; and correct the number of rotation after the multi-turn servo is reboot according to the power-on angle.

In an example, the turns correction unit further includes:

a power-off information obtaining sub-unit configured to obtain a power-off angle and a power-off turns before the multi-turn servo is powered off;

a power-on information obtaining sub-unit configured to detect the power-on angle after the multi-turn servo is reboot;

a power-off turns-adding sub-unit configured to determine if the power-on angle is smaller than the power-off angle, and to determine if a difference between the power-on angle and the power-off angle is greater than a default contrast angle in response to the power-on angle is smaller than the power-off angle. The power-off turns-adding sub-unit is configured to add the number of power-off turns by one when the difference between the power-on angle and the power-off angle is greater than the default contrast angle; and a power-off turns-minus sub-unit configured to decrement the number of power-off turns by one when the power-on angle is greater than the power-off angle and the difference between the power-on angle and the power-off angle is greater than a default contrast angle.

In the embodiment, when the multi-turn servo is suddenly powered off during operation, the number of rotation is accurately corrected according to the power-on angle after the servo is reboot and the power-off angle before the servo is power-off. In this way, the rotation angle of the multi-turn servo, after the servo is reboot, can be determined so as to control the multi-turn position of the multi-turn servo. This expands the angle detection range of the servo, and expands the application fields of the servo.

Figure 2:
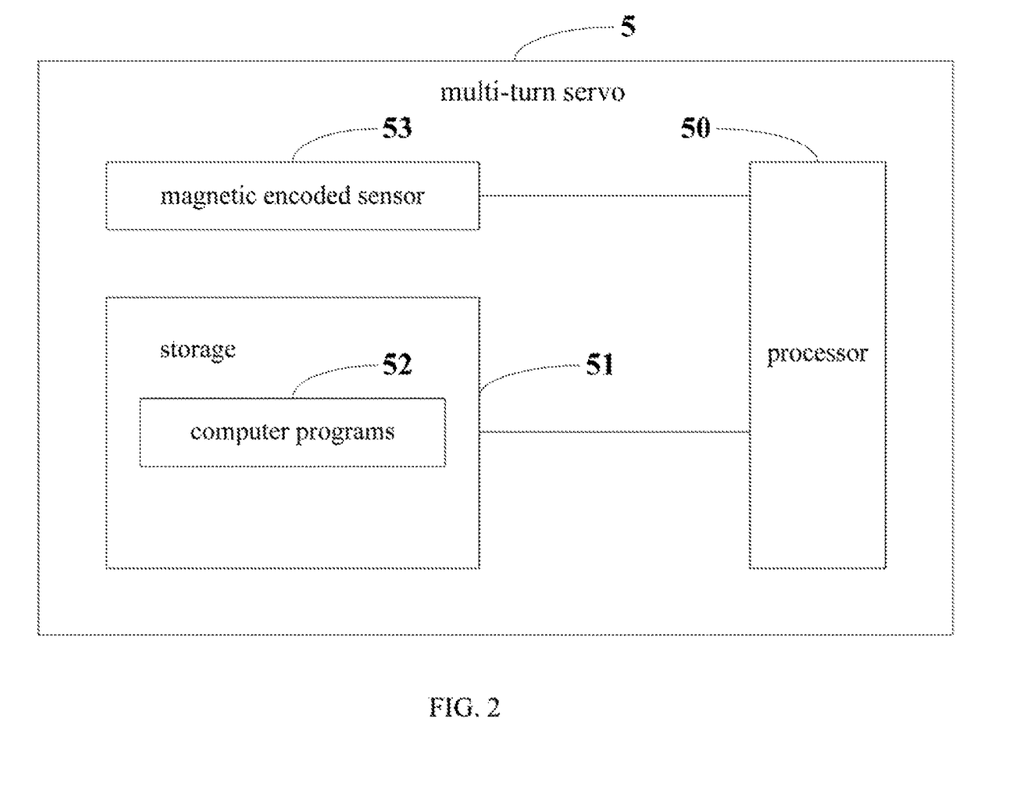
FIG. 2 is a schematic view of a multi-turn servo in accordance with one embodiment of the present disclosure.

FIG. 2 is a schematic diagram of a servo according to an embodiment of the present disclosure. For the convenience of description, only the parts related to this embodiment are shown. As shown in FIG. 2, in this embodiment, a multi-turn servo 5 includes a magnetic encoded sensor 53 configured to detect angle information, a storage 51 configured to store the angle information, the number of rotation of the multi-turn servo and a computer program 52 executable on a processor 50. When the processor 50 executes the computer program 52, the functions of the units 310-360 as shown in FIG. 1, are implemented.

Exemplarily, the computer program 52 may be divided into one or more modules/units, and the one or more modules/units are stored in the storage 51 and executed by the processor 50 to realize the present disclosure. The one or more modules/units may be a series of computer program instruction sections capable of performing a specific function, and the instruction sections are for describing the execution process of the computer program 52 in the multi-turn servo 5. For instance, the computer program 52 may include the computer instructions respectively executed in the zero-point adjusting unit 310, the zero-point obtaining unit 320, the current angle detection unit 330, the incrementing unit 340, the decrementing unit 350, and the angle-rotation determination unit 360.

It can be understood by those skilled in the art that FIG. 2 is merely an example of the multi-turn servo 5 and does not constitute a limitation on the multi-turn servo 5, and may include more or fewer components than those shown in the figure, or a combination of some components or different components. For example, the multi-turn servo 5 may further include an input/output device, a network access device, a bus, and the like.

The processor 50 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 51 may be an internal storage unit of the multi-turn servo 5, for example, a hard disk or a memory of the multi-turn servo 5. The storage 51 may also be an external storage device of the multi-turn servo 5, for example, a plug-in hard disk, a smart media card (SMC), a secure digital (SD) card, flash card, and the like, which is equipped on multi-turn servo 5. Furthermore, the storage 51 may further include both an internal storage unit and an external storage device, of the multi-turn servo 5. The storage 51 is configured to store the computer program and other programs and data required by the multi-turn servo 5. The storage 51 may also be used to temporarily store data that has been or will be output.

Figure 3:
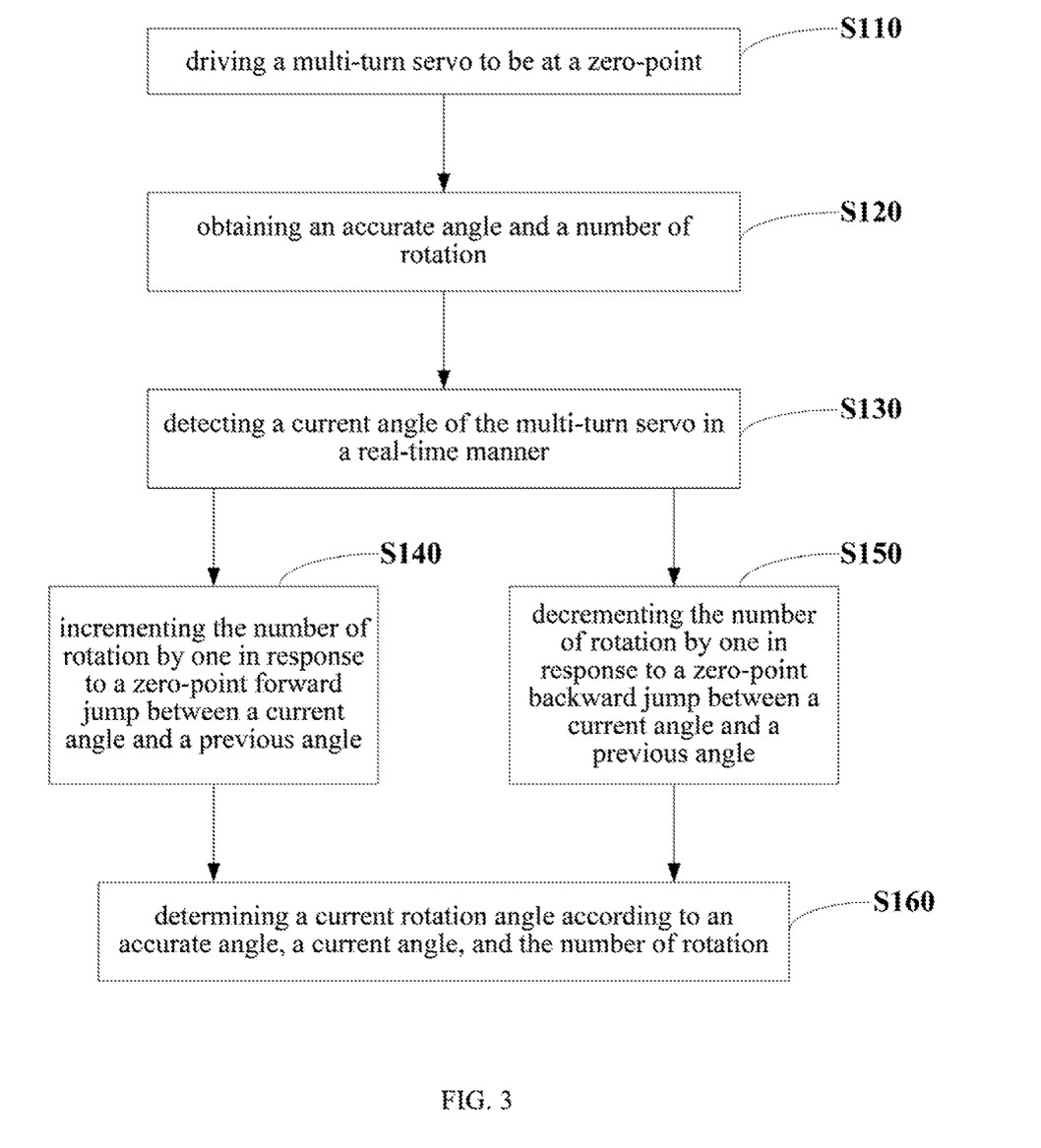
FIG. 3 is a flow chart of an angle detection method of a multi-turn servo in accordance with a first embodiment of the present disclosure.

FIG. 3 is a flow chart of an angle detection method of a multi-turn servo in accordance with a first embodiment of the present disclosure. The method includes:

In step S110, driving a multi-turn servo to be at a zero-point position.

Specifically, an initial angle of the multi-turn servo is obtained when the multi-turn servo is at an initial position. When the initial angle is the same with a default angle, the initial position is labeled as the zero-point position, wherein the default angle is directed to an angle when the multi-turn servo is at the zero-point position. The initial position is adjusted to be the default angle and the adjusted position is labeled to be the zero-point position of the multi-turn servo in response to the initial angle is different from the default angle.

In step S120, obtaining an accurate angle and a number of rotation when the multi-turn servo is at the zero-point position;

Specifically, the step further includes detecting the accurate angle and the number of rotation when the multi-turn servo is at the zero-point position. In addition, the accurate angle and the number of rotation are stored in the storage. In an example, when the multi-turn servo is at the zero-point position, the number of rotation is recorded as "0".

In step S130, detecting a current angle of the multi-turn servo in a real-time manner;

Specifically, the step further includes calculating the number of rotation in accordance with the current angle.

In step S140, incrementing the number of rotation by one in response to a zero-point forward jump between a current angle and a previous angle, wherein the zero-point forward jump is directed to an angle change when the multi-turn servo rotates across the zero-point along a first direction;

In step S150, decrementing the number of rotation by one in response to a zero-point backward jump between a current angle and a previous angle, wherein the zero-point backward jump refers to an angle change when the multi-turn servo rotates across the zero-point along a second direction opposite to the first direction.

In step S160, determining a current rotation angle of the multi-turn servo in accordance with an accurate angle, a current angle, and the number of rotation.

In an example, the angle of 0 degree is taken as the zero-point position, and the accurate angle may increase when the servo rotates along a clockwise direction. Assuming that the maximum rotational speed of the multi-turn servo is ω, the current angle of the multi-turn servo is detected every time t, that is, the maximum angular difference between the two detections is ω*t. When the current angle jumps from (360°−ω*t°, 360°) to (0°, ω*t°) between the current angle detection and the previous angle detection, this is directed to the zero-point forward jump. Thus, the number of rotation is added by one. When the current angle jumps from (0°, ω*t°) to (360°, 360°) between the current angle detection and the previous angle detection, this is directed to the zero-point backward jump. Thus, the number of rotation is decremented by one. In a example, the number of rotation may be decrementing by a value other than one.

In an example, if the current angle jumps from 357 degrees to 1 degree after a time period (t), it is determined that a zero-point forward jump occurs. At this moment, the number of rotation is added by one. If the current angle jumps from 1 degree to 356 degrees, it is determined that a zero-point backward jump occurs. At this moment, the number of rotation is decremented by one.

In one embodiment, the angle is increased along a clockwise direction, and 0 degree is defined as the zero-point position. However, this is only an example. For instance, the angle is increased along a counter-clockwise direction.

In another example, the angle is increased along a counter-clockwise direction, and 30 degrees is defined as the zero-point position. Correspondingly, when the current angle jumps from (30°−ω*t°, 30°) to (30°, 30°+ω*t°) between the current angle detection and the previous angle detection, the number of rotation is decremented by one. When the current angle jumps from (30°, 30°+*t°) to (30°−ω*t°, 30°) between the current angle detection and the previous angle detection, the number of rotation is added by one.

In step S160, determining a current rotation angle of the multi-turn servo in accordance with an accurate angle, a current angle, and the number of rotation.

In an example, the current rotation angle (φ) of the multi-turn servo is calculated in accordance with the equation below:

$$\varphi = (n'-n)*360° + \theta' - \theta;$$

wherein n is the number of rotation of the multi-turn servo at the zero position, n' is the number of rotation of the multi-turn servo at the current position, and θ is the accurate angle of the multi-turn servo at the zero-point position, and θ' is the current angle of the multi-turn servo at the current position.

In view of the above, the rotation angle of the multi-turn servo may be precisely determined so as to realize the angle control of the servo. This not only expand the angle detection scope, but also enlarge the application field of the servo.

Figure 4:
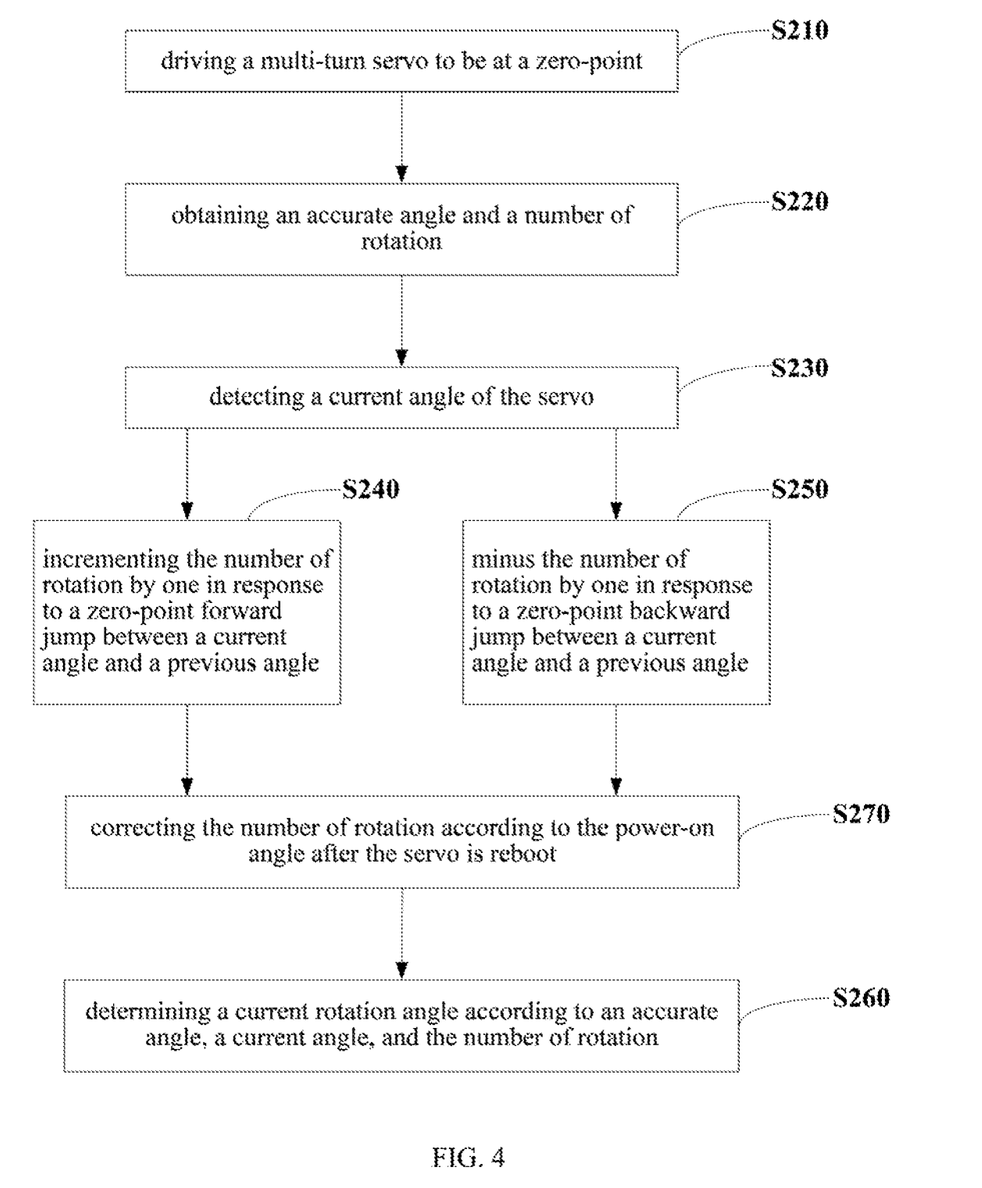
FIG. 4 is a flow chart of an angle detection method of a multi-turn servo in accordance with a second embodiment of the present disclosure.

FIG. 4 is a schematic view of a multi-turn servo in accordance with a second embodiment of the present disclosure. In this embodiment, step S210, S220, S230, S240, S250, and S260 are the same with the step S110, S120, S130, S140, S150, and S160 in the first embodiment. In this embodiment, the method further includes a step S270 before the step S260.

In step S270, when the multi-turn servo is suddenly powered off during operation, the number of rotation is accurately corrected according to the power-on angle after the servo is reboot. This step is configured for the reason that when the multi-turn servo is suddenly powered off, the multi-turn servo may keep on rotating, which may cause an incorrect number of rotation.

In an example, the step S270 further includes:
obtaining a power-off angle and a power-off turns before the multi-turn servo is powered off;
detecting the power-on angle after the multi-turn servo is reboot;
incrementing the number of power-off turns by one when the power-on angle is smaller than the power-off angle and a difference between the power-on angle and the power-off angle is greater than a default contrast angle; and
decrementing the number of power-off turns by one when the power-on angle is greater than the power-off angle and the difference between the power-on angle and the power-off angle is greater than a default contrast angle.

Figure 5:
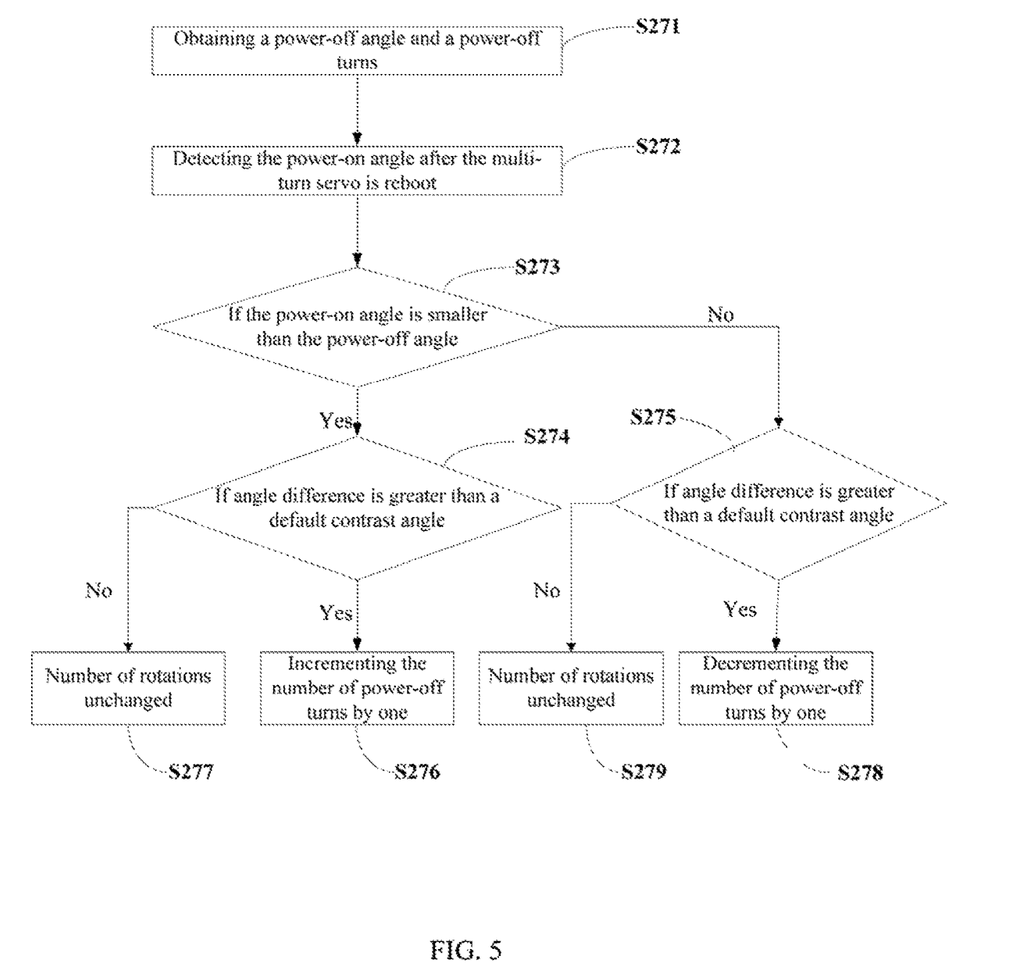
FIG. 5 is a flow chart illustrating the step S270 of the angle detection method of a multi-turn servo in FIG. 4.

In FIG. 5, the method further includes:
In step S271, obtaining a power-off angle and a power-off turns before the multi-turn servo is powered off;
In step S272, detecting the power-on angle after the multi-turn servo is reboot;
In step S273, determining if the power-on angle is smaller than the power-off angle; if the power-on angle is smaller than the power-off angle, the process goes to step S274. Otherwise, the process goes to step S275.

In step S274, determining if a difference between the power-on angle and the power-off angle is greater than a default contrast angle; if the difference between the power-on angle and the power-off angle is greater than a default contrast angle, the process goes to step S276. Otherwise, the process goes to step S277;

In step S276, incrementing the number of power-off turns by one in response to the difference between the power-on angle and the power-off angle being greater than the default contrast angle;

In step S277, keeping the number of power-off turns unchanged in response to the difference between the power-on angle and the power-off angle being smaller than the default contrast angle.

In step S273, the process goes to step S275 in response to the power-on angle being not smaller than the power-off angle.

In step S275, determining if a difference between the power-on angle and the power-off angle is greater than a default contrast angle; if the difference between the power-on angle and the power-off angle is greater than the default contrast angle, the process goes to step S278. Otherwise, the process goes to step S278.

In step S278, decrementing the number of power-off turns by one in response to the power-on angle being greater than the power-off angle;

In step S279, keeping the number of rotation unchanged in response to the difference between the power-on angle and the power-off angle being smaller than the default contrast angle.

In this example, the angle of 0 degree is taken as the zero-point position, the accurate angle may increase when the servo rotates along a clockwise direction, and during the power-off period, the rotation of the multi-turn servo does not exceed over 180 degrees. That is, the rotation of the multi-turn servo is within a range of (−180°, 180°). The default contrast angle is configured to be 180 degrees.

If the power-on angle is greater than the power-off angle, and the difference between the power-on angle and the power-off angle is greater than 180 degrees, it is determined that the rotation of the servo along the clockwise direction is smaller than 180 degrees and the rotation across the zero-point. Thus, the power-off turn recorded before the servo is power off has to be added by one.

If the power-on angle is smaller than the power-off angle, and the difference between the power-on angle and the power-off angle is smaller than 180 degrees, it is determined that the rotation of the servo along the counter-clockwise direction is smaller than 180 degrees and the rotation is not across the zero-point. That is, the number of power-off turns remain unchanged.

If the power-on angle is greater than the power-off angle, and the difference between the power-on angle and the power-off angle is greater than 180 degrees, it is determined that the rotation of the servo along the counter-clockwise direction is smaller than 180 degrees and the rotation is across the zero-point. That is, the number of power-off turns has to be decremented by one.

If the difference between the power-on angle and the power-off angle is smaller than 180 degrees, it is determined that the rotation of the servo along the clockwise direction is smaller than 180 degrees and the rotation is not across the zero-point. That is, the number of power-off turns remain unchanged.

In an example, when the power-off angle before the servo is powered off is 270 degrees, and the power-on angle after the servo is reboot is 60 degree, the power-off angle is greater than the power-on angle for 210 degrees. The rotation of the servo during the power-off period is in the range of (−180°, 180°). This shows that the servo rotates for 150 degrees along a clockwise direction during the power-off period, and the rotation is across the zero-point position, i.e., 0 degree. Thus, the power-off turns is added by one, which is configured as the current rotation turns of the multi-turn servo.

In another example, when the power-off angle before the servo is powered off is 270 degrees, and the power-on angle after the servo is reboot is 120 degrees, the power-off angle is greater than the power-on angle for 150 degrees. This shows that the servo rotates for 150 degrees along a counter-clockwise direction during the power-off period. Thus, the power-off turns remains unchanged.

In another example, when the power-off angle before the servo is powered off is 40 degrees, and the power-on angle after the servo is reboot is 230 degrees. This shows that the servo rotates for 170 degrees along a counter-clockwise direction during the power-off period, and the servo rotates across the zero-point position. Thus, the power-off turns has to be decremented by one.

In another example, when the power-off angle before the servo is powered off is 110 degrees, and the power-on angle after the servo is reboot is 200 degrees. This shows that the servo rotates for 90 degrees along a clockwise direction during the power-off period without across the zero-point position. Thus, the power-off turns remains unchanged.

It should be understood that, the sequence of the serial number of the steps in the above-mentioned embodiments does not represent the execution order. The order of the execution of each process should be determined by its function and internal logic, and should not cause a limitation to the implementation process of the embodiments of the present disclosure.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented method for detecting rotation angle of a multi-turn servo, wherein a magnetic encoded sensor electrically connected to the multi-turn servo, the method comprising executing on a processor steps of:
    driving the multi-turn servo to be at a zero-point position;
    obtaining an accurate angle and a number of rotation of the multi-turn servo by the magnetic encoded sensor when the multi-turn servo is at the zero-point position;
    detecting a current angle of the multi-turn servo in a real-time manner by the magnetic encoded sensor;
    incrementing the number of rotation by one in response to a zero-point forward jump between the current angle and a previous angle, wherein the zero-point forward jump is a first angle change of the multi-servo when the multi-turn servo rotates across the zero-point along a first direction;
    decrementing the number of rotation by one in response to a zero-point backward jump between the current angle and the previous angle, wherein the zero-point backward jump is a second angle change of the multi-turn servo when the multi-turn servo rotates across the zero-point along a second direction opposite to the first direction; and
    determining a current rotation angle of the multi-turn servo in accordance with the accurate angle, the current angle, and the number of rotation of the multi-turn servo;
    wherein the driving step further comprises:
    obtaining an initial angle of the multi-turn servo when the multi-turn servo is at an initial position;
    labeling the initial position as the zero-point position in response to the initial angle being the same with a default angle, wherein the default angle is directed to an angle when the multi-turn servo is at the zero-point position; and
    adjusting the initial angle to be the default angle to adjust the multi-turn servo to be at the zero-point position in response to the initial angle being different from the default angle.

2. The method as claimed in claim 1, wherein before the determining step, the method further includes:
    storing a power-on angle in response to the multi-turn servo being powered off; and
    correcting the number of rotation after the multi-turn servo is reboot according to a power-on angle.

3. The method as claimed in claim 2, wherein the correcting step further comprises:
    obtaining the power-off angle and a power-off turns before the multi-turn servo is powered off;
    detecting the power-on angle after the multi-turn servo is reboot;
    incrementing a number of power-off turns by one in response to the power-on angle being smaller than the power-off angle and a difference between the power-on angle and the power-off angle being greater than the default contrast angle; and
    decrementing the number of power-off turns by one in response to the power-on angle being greater than the power-off angle and the difference between the power-on angle and the power-off angle being greater than a default contrast angle.

4. A computing device for detecting rotation angle of a multi-turn servo, the device comprising:
    one or more processors;
    a magnetic encoded sensor electrically connected to the multi-turn servo and the one or more processors;

a non-transitory computer-readable storage medium, wherein computerized instructions are stored in the storage and configured to executed a method, the method comprises:

driving the multi-turn servo to be at a zero-point position;

obtaining an accurate angle and a number of rotation of the multi-turn servo by the magnetic encoded sensor when the multi-turn servo is at the zero-point position;

detecting a current angle of the multi-turn servo in a real-time manner by the magnetic encoded sensor;

incrementing the number of rotation by one in response to a zero-point forward jump between the current angle and a previous angle, wherein the zero-point forward jump is a first angle change of the multi-servo when the multi-turn servo rotates across the zero-point along a first direction;

decrementing the number of rotation by one in response to a zero-point backward jump between the current angle and the previous angle, wherein the zero-point backward jump is a second angle change of the multi-turn servo when the multi-turn servo rotates across the zero-point along a second direction opposite to the first direction; and determining a current rotation angle of the multi-turn servo in accordance with the accurate angle, the current angle, and the number of rotation of the multi-turn servo;

wherein the driving step further comprises:

obtaining an initial angle of the multi-turn servo when the multi-turn servo is at an initial position;

labeling the initial position as the zero-point position in response to the initial angle being the same with a default angle, wherein the default angle is directed to an angle when the multi-turn servo is at the zero-point position; and adjusting the initial angle to be the default angle to adjust the multi-turn servo to be at the zero-point position in response to the initial angle being different from the default angle.

5. The device as claimed in claim 4, wherein before the determining step, the method further includes:

storing a power-on angle in response to the multi-turn servo being powered off; and correcting the number of rotation after the multi-turn servo is reboot according to a power-on angle.

6. The device as claimed in claim 5, wherein the correcting step further comprises:

obtaining the power-off angle and a power-off turns before the multi-turn servo is powered off;

detecting the power-on angle after the multi-turn servo is reboot;

incrementing a number of power-off turns by one in response to the power-on angle being smaller than the power-off angle and a difference between the power-on angle and the power-off angle being greater than the default contrast angle; and decrementing the number of power-off turns by one in response to the power-on angle being greater than the power-off angle and the difference between the power-on angle and the power-off angle being greater than a default contrast angle.

7. A multi-turn servo, comprising:

one or more processors;

a magnetic encoded sensor electrically connects to the one or more processors;

a non-transitory computer-readable storage medium; and one or more computer programs, wherein the one or more computer programs are stored on the storage and configured to be executed by the one or more processors, the one or more computer programs comprising:

instructions for driving a multi-turn servo to be at a zero-point position;

instructions for obtaining an accurate angle and a number of rotation of the multi-turn servo by the magnetic encoded sensor when the multi-turn servo is at the zero-point position;

instructions for detecting a current angle of the multi-turn servo in a real-time manner by the magnetic encoded sensor;

instructions for incrementing the number of rotation by one in response to a zero-point forward jump between the current angle and a previous angle, wherein the zero-point forward jump is a first angle change of the multi-servo when the multi-turn servo rotates across the zero-point along a first direction;

instructions for decrementing the number of rotation by one in response to a zero-point backward jump between the current angle and the previous angle, wherein the zero-point backward jump is a second angle change of the multi-turn servo when the multi-turn servo rotates across the zero-point along a second direction opposite to the first direction; and instructions determining a current rotation angle of the multi-turn servo in accordance with the accurate angle, the current angle, and the number of rotation of the multi-turn servo;

wherein the instructions for driving a multi-turn servo to be at a zero-point position comprises:

instructions for obtaining an initial angle of the multi-turn servo when the multi-turn servo is at an initial position;

instructions for labeling the initial position as the zero-point position in response to the initial angle being the same with a default angle, wherein the default angle is directed to an angle when the multi-turn servo is at the zero-point position; and instructions for adjusting the initial angle to be the default angle so as to adjust the multi-turn servo to be at the zero-point position in response to the initial angle being different from the default angle.

8. The multi-turn servo of claim 7, wherein before the determining step, the one or more computers further comprise:

instructions for storing a power-on angle in response to the multi-turn servo being powered off; and instructions for correcting the number of rotation after the multi-turn servo is reboot according to a power-on angle.

9. The multi-turn servo of claim 8, wherein the instructions for correcting the number of rotation after the multi-turn servo is reboot according to the power-on angle comprises:

instructions for obtaining the power-off angle and a power-off turns before the multi-turn servo is powered off;

instructions for detecting the power-on angle after the multi-turn servo is reboot;

instructions for plus a number of power-off turns by one in response to the power-on angle being smaller than the power-off angle and a difference between the power-on angle and the power-off angle being greater than the default contrast angle; and instructions for decrementing the number of power-off turns by one in response to the power-on angle being greater than the power-off angle and the difference between the power-on angle and the power-off angle being greater than a default contrast angle.

\* \* \* \* \*